United States Patent Office 2,693,487
Patented Nov. 2, 1954

2,693,487
MONOSULFONATION OF BENZENE

Robert D. Swisher, Winchester, Mass., assignor to Monsanto Chemical Company, St. Louis, Mo., a corporation of Delaware No Drawing. Application January 30, 1948,
Serial No. 5,490

2 Claims. (Cl. 260—505)

The present invention relates to an improved method of sulfonating benzene in the liquid phase and to the preparation of a benzene monosulfonic acid which is adapted for the preparation of high quality phenol and other benzene derivatives.

The liquid phase sulfonation of benzene with 100% sulfuric acid or low strength oleums comprising up to 30% free $SO_3$ is well known. This method, while of some practical importance, is inefficient in that excessive quantities of acid or low strength oleums are required for the sulfonation and the reaction mixture contains large amounts of unreacted acid or oleums which must be removed or eliminated before the monosulfonic acid or salts thereof can be converted to phenol or other benzene derivatives. This results in the inefficient employment of processing equipment and the use of excessive amounts of chemicals to neutralize such acids. Moreover, the method also is inefficient in that the reaction time required is too long, and the equipment employed to carry out the reaction cannot be utilized to maximum capacity.

Attempts to overcome these difficulties by sulfonating the benzene with high strength oleums comprising 60% or more $SO_3$ have not been successful heretofore. For example, it was found that the yield of benzene monosulfonic acid was less than that obtained by the older method described above. Moreover, from 10 to 40% of the reaction product consists of undesirable side-reaction products as, for example, diphenyl sulfone, polysulfones and the like.

It is one object of the present invention to prepare a benzene monosulfonic acid which is adapted for the preparation of high quality phenol and other products by sulfonating benzene in the liquid phase with high strength oleums comprising from 60 to 100% free $SO_3$.

A further object of the invention is to provide an improved method of preparing benzene monosulfonic acid by the sulfonation of benzene in the liquid phase with high strength oleums comprising from 60 to 100% free $SO_3$ wherein the formation of side-reaction products is substantially prevented.

A further object of the invention is to provide a simple and efficient method for the preparation of benzene monosulfonic acid by sulfonating benzene in the liquid phase with high strength oleums comprising 60 to 100% free $SO_3$.

Still further objects and advantages of the invention will appear from the following descriptions and the appended claims.

The invention is, in general, carried out by reacting benzene and high strength oleums comprising about 60 to 100% free $SO_3$ at temperatures below about 100° C. and in the presence of a small proportion of an alkali metal sulfate such as $Na_2SO_4$ and $K_2SO_4$, alkali-earth metal sulfates such as $CaSO_4$ and $BaSO_4$ or an alkali metal or alkali-earth metal salt of benzene monosulfonic acid as, for example, sodium benzene monosulfonate and barium benzene monosulfonate or combinations thereof. Of these sulfate or sulfonate salts, $Na_2SO_4$ is preferred.

The invention also contemplates the working up of such products into high quality phenols and other products. For example, the product as obtained herein is worked up directly into phenol by neutralizing the sulfonic acid and any acid products contained therein, separating the sulfonate from the salts formed during such neutralization reaction, fusing such sulfonate with a suitable alkali and then recovering phenol from the fusion product.

Ordinarily when benzene is sulfonated with $SO_3$ it is found that the reaction product will normally contain from about 20 to 25% or more of diphenyl sulfone. By conducting such reaction in the presence of a small proportion, say 0.025 mol of sulfate or sulfonate salts of the type herein described per mol of benzene, the formation of such side-reaction products is eliminated to a substantial degree or even substantially prevented since such products will only be present in amounts ranging from about 3 to 4% by weight of the reaction product.

A further understanding of the invention will be obtained from the following examples which are intended to be illustrative, but not limitative, parts and percentages being by weight unless otherwise specified.

Example I

Benzene, 100% oleum (100% $SO_3$) and solid anhydrous sodium sulfate are added to a reactor at rates of 5.7, 5.9 and 0.35 parts per minute respectively, which amounts represent about equal molecular ratios of benzene to $SO_3$ and about 0.03 mol of $Na_2SO_4$ per mol of benzene. The reactor is so constructed as to hold about 100 to 150 parts of reaction product as a heel which is constantly circulated over the benzene and oleum inlets. The reaction is essentially instantaneous and the reaction product is withdrawn constantly through an overflow line. The temperature of the reactants in the reactor is maintained at about 75° C. The reaction product coming from the overflow outlet analyzes approximately as follows:

|  | Percent |
|---|---|
| Benzene sulfonic acid (mono) | 90 |
| Diphenyl sulfone | 3.5 |
| Sulfuric acid | 3.5 |
| Sodium sulfate | 3.0 |

Another batch prepared in similar manner, except that $Na_2SO_4$ is omitted gives a product of the following approximate composition:

|  | Percent |
|---|---|
| Benzene monosulfonic acid | 63 |
| Diphenyl sulfone | 24 |
| Sulfuric acid | 13 |

Example II

Benzene, 65% oleum and anhydrous sodium sulfate are fed continuously into a heel of the reaction product which is kept well agitated. The rate of feed of benzene and 65% oleum is so adjusted that benzene and free $SO_3$ in the oleum are present in approximately equal molecular proportions while the $Na_2SO_4$ rate of feed is about 0.05 mol per mol of benzene being added. The reaction product is continuously removed from the reaction zone through an overflow tube or pipe. The temperature of the reactants is maintained at a temperature of about 75° C. The reaction product analyzes approximately as follows:

|  | Percent |
|---|---|
| Benzene monosulfonic acid | 75 |
| $H_2SO_4$ | 20 |
| $Na_2SO_4$ | 4 |
| Diphenyl sulfone | 1 |

The invention may be carried out as a continuous process as described in the foregoing examples, or the monosulfonic acid may be allowed to accumulate in the reactor. Either method may be used depending upon the manner in which the monosulfonic acid is to be further processed, that is, whether it is to be sulfonated further; converted to phenols; converted to other derivatives of benzene, or whether it is to be recovered, for example, as a sulfonate.

In carrying out the process or method herein described, and especially in practicing a continuous method of sulfonation, it is preferable to employ benzene and a 60 to 100% oleum in such proportions that the accumulation of unreacted benzene or $SO_3$ is substantially avoided since such unreacted materials generally must be removed from the reaction product unless a disulfonation reaction is to follow. It is preferable to react the benzene and SO₃ contained in a 60 to 100% oleum in approximately equal molecular proportions as, for example, about one mol of benzene to one mol of SO₃ in the oleum.

Generally, the temperature of the reacting mixture employed herein is maintianed below 100° C. while temperatures of from about 50 to 85° C. are particularly desirable.

Although the quantity of Na₂SO₄, or other salt of the type hereinbefore described, which is present during the sulfonation reaction may be varied to some extent it is preferable to employ at least 0.01 mol of such salt per mol of benzene during the sulfonation reaction. A range of about 0.03 to 0.2 mol of such salt per mol of benzene is generally most effective though even larger quantities, that is, from 0.2 to 3.0 mols may be used. However, there is no noticeable advantage in using such larger quantities.

The monosulfonic acid as prepared herein may be converted directly to phenol, for example, by well-known fusion methods. In general, such conversion is carried out by neutralizing the monosulfonic acid reaction mixture with an alkali; removing the inorganic salts therefrom in suitable manner; drying the sulfonate or working it up into a concentrated solution; charging the dried sulfonate or solution thereof into molten alkali; dissolving the fused mass in water; acidifying the aqueous solution thereof and then separating the phenol layer.

Benzene derivatives other than phenol may be prepared directly from the reaction mixture or from the neutralized benzene monosulfonic acid by any of the well-known methods.

What is claimed is:

1. A method of preparing benzene monosulfonic acid which comprises reacting benzene and SO₃ in the form of a 60 to 100% oleum in about equal molecular proportions in the presence of from about 0.03 to 0.2 mol per mol of benzene of a material selected from the group consisting of alkali metal sulfates, alkali-earth metal sulfates, alkali metal benzene sulfonates and alkali-earth metal benzene sulfonates.

2. A method of preparing benzene monosulfonic acid which comprises reacting in about equal molecular proportions benzene and SO₃ in the form of a 60 to 100% oleum in the presence of from 0.03 to 0.2 mol of sodium sulfate per mol of benzene in a reaction zone at a temperature of 50 to 80° C., and continuously removing the reaction product from the reaction zone.

References Cited in the file of this patent

UNITED STATES PATENTS

| Number | Name | Date |
|---|---|---|
| 1,179,415 | Ellis | Apr. 18, 1916 |
| 1,207,798 | Sachs et al. | Dec. 12, 1916 |
| 1,228,414 | Dennis | June 5, 1917 |
| 1,396,320 | Cole | Nov. 8, 1921 |
| 1,708,103 | Marx et al. | Apr. 9, 1929 |
| 1,709,447 | Tunison | Apr. 16, 1929 |
| 1,734,050 | Seck | Nov. 5, 1929 |
| 1,915,925 | Cotton | June 27, 1933 |
| 1,999,955 | Carr | Apr. 30, 1935 |
| 2,143,963 | Tinker | Jan. 17, 1939 |
| 2,149,662 | Brandt | Mar. 7, 1939 |
| 2,203,440 | Oliver | June 4, 1940 |

OTHER REFERENCES

Ambler et al., Ind. Eng. Chem., v. 12 (1920), pages 968–969.

Groggins, Unit Processes in Org. Syn. Sec. Ed. 1938, pages 237, 265.